United States Patent [19]

Wainauski et al.

[11] Patent Number: 4,519,746
[45] Date of Patent: May 28, 1985

[54] AIRFOIL BLADE

[75] Inventors: Harry S. Wainauski, Simsbury; Carl Rohrbach, Manchester, both of Conn.

[73] Assignee: United Technologies Corporation, Hartford, Conn.

[21] Appl. No.: 286,484

[22] Filed: Jul. 24, 1981

[51] Int. Cl.³ .............................................. B64C 11/18
[52] U.S. Cl. ................................... 416/223 R; 416/237
[58] Field of Search ................... 416/237, 242, 223 R, 416/DIG. 2

[56] References Cited

U.S. PATENT DOCUMENTS

| | | | |
|---|---|---|---|
| 2,709,052 | 5/1955 | Berg | 244/35 |
| 3,494,424 | 2/1970 | Stanley | 416/223 |
| 3,625,459 | 12/1971 | Brown | 244/35 |
| 3,706,430 | 12/1972 | Kline et al. | 244/35 |
| 3,854,845 | 12/1974 | Van DeWater | 416/228 |
| 3,890,062 | 6/1975 | Hendrix et al. | 416/234 |
| 3,915,106 | 10/1975 | DeWitt | 114/66.5 H |
| 3,946,688 | 3/1976 | Gornstein et al. | 114/66.5 H |
| 3,952,971 | 4/1976 | Whitcomb | 244/35 R |
| 4,046,489 | 9/1977 | Fairchild et al. | 416/223 R |
| 4,050,651 | 9/1977 | Neal et al. | 244/15 |
| 4,063,852 | 12/1977 | O'Connor | 416/228 |
| 4,072,282 | 2/1978 | Fulker et al. | 244/35 R |
| 4,120,609 | 10/1978 | Chou et al. | 416/223 |
| 4,121,787 | 10/1978 | Wilby | 244/35 R |
| 4,123,198 | 10/1978 | Harbord | 416/243 |
| 4,147,437 | 4/1979 | Jonqueres | 366/343 |
| 4,240,597 | 12/1980 | Ellis et al. | 244/35 R |
| 4,240,598 | 12/1980 | Espin et al. | 244/35 R |

FOREIGN PATENT DOCUMENTS 0647159 12/1950 United Kingdom ................ 416/242

Primary Examiner—Philip R. Coe
Assistant Examiner—Christine A. Peterson
Attorney, Agent, or Firm—John Swiatocha

[57] ABSTRACT

An improved airfoil blade for aircraft propellers and the like which exhibits high aerodynamic performance and low far and near field noise levels at a minimum weight is provided with a novel high lift and high lift to drag cross-sectional airfoil shape characterized by a blunt, generally parabolic leading edge portion (10) which fairs into a pressure surface (15) characterized by a leading convex portion (20). For thickness ratios less than approximately 0.15, the pressure surface includes a concave trailing portion (25) at one end thereof, fairing into the leading convex portion (20) and at the other end thereof, terminating at a blunt trailing edge (35). The leading edge portion also fairs into a suction surface (30) which is convex along substantially the entire length thereof to the blade trailing edge.

3 Claims, 21 Drawing Figures

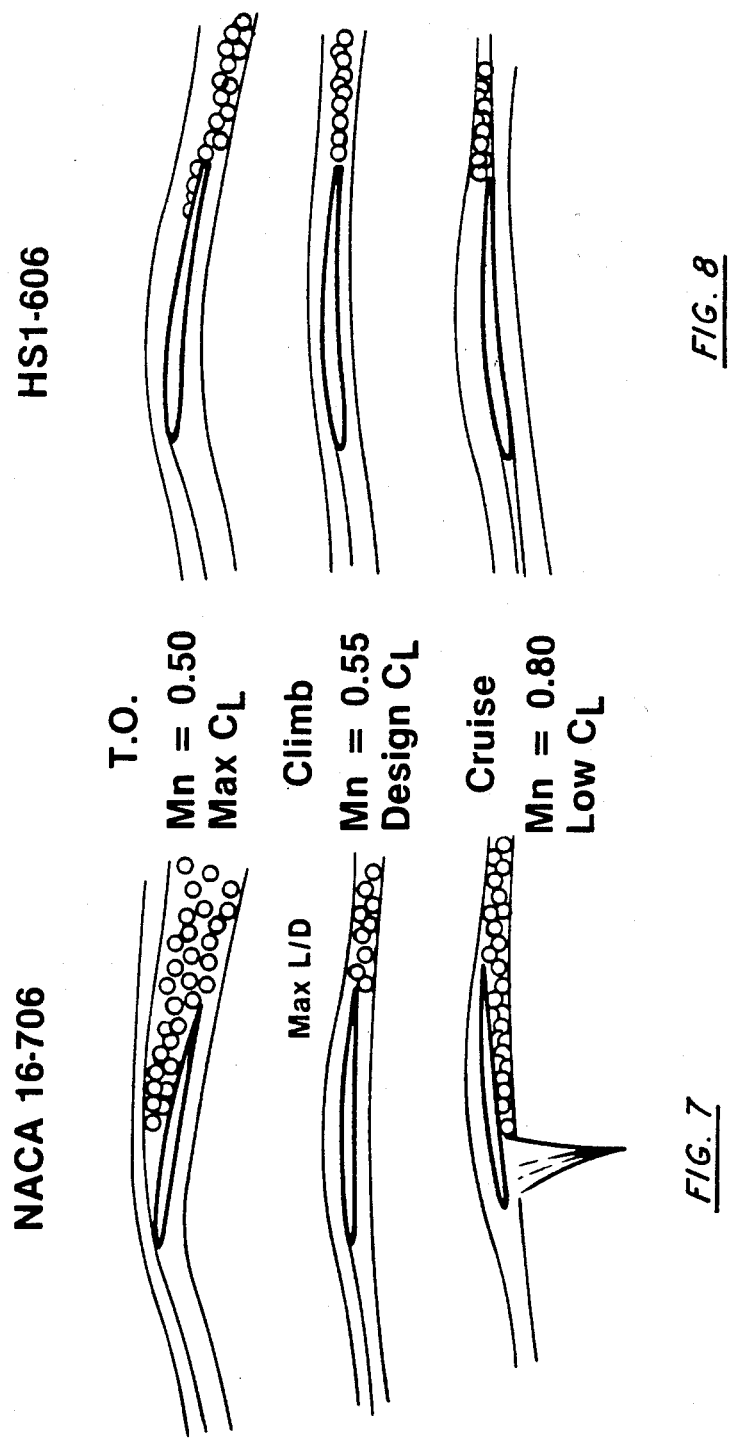

AIRFOIL BLADE

TECHNICAL FIELD

This invention relates in general to airfoil blades for rotors and particularly to a family of airfoils particularly for high-performance, low-noise aircraft propeller blades.

BACKGROUND ART

Current and expected trends in air travel have led to the design of a new generation of turboprop commuter aircraft which are expected to enter service in the mid 1980's. These are short haul aircraft, expected to service small airports located relatively close to populated areas. Accordingly, far-field noise restrictions for the aircraft will be quite demanding. The commuter aircraft will be used extensively by travelers in the initial and final legs of trips wherein the major portion of the distance traveled will be by modern, comfortable, wide-bodied turbofan aircraft. Accordingly, the demands on the commuter aircraft for safety, comfort, reliability and low cabin noise levels will be stringent.

To meet such stringent far-field and cabin noise restrictions, propeller tip speed must be kept to a minimum. However, since the new commuter aircraft are designed to operate from short runways, such low tip speeds must impart high blade thrust levels (lift coefficients) to the propellers at low blade weights (low blade solidities) for takeoff and climb modes of operation. Even with a minimization of tip speed, air speed over the propeller blade surfaces is necessarily quite high. To avoid pronounced shock waves and the attendant flow separation and sacrifice in performance resulting therefrom, it is necessary to maximize the critical Mach numbers associated with the aircraft propeller blade airfoil sections. For enhanced efficiency, high lift-to-drag coefficients at cruise conditions are also required.

In addition to satisfying the above-noted aerodynamic performance and noise requirements, the propeller blades must be capable of being manufactured with known production techniques and should exhibit a minimum risk of damage from both normal handling and impact with foreign objects.

State of the art airfoil families which define propellers and the like include the NACA Series 6 and Series 16 airfoils which heretofore have exhibited adequate aerodynamic and noise performance. However, for the new generation commuter aircraft noted hereinabove, the performance characteristics of propellers defined by such airfoil shapes are marginal at best. Newer airfoils such as the Lieback, Wortmann, Whitcomb supercritical, and GAW airfoils have been designed for special wing configurations and as such, are not suitable for general propeller use in that for the most part, these airfoils incorporate shapes undesirable for propeller manufacture from structural and fabrication standpoints.

DISCLOSURE OF INVENTION

Accordingly, it is an object of the present invention to provide an improved airfoil blade characterized by airfoil sections having associated therewith, high lift coefficients, especially in aircraft takeoff and climb modes of operation.

It is another object of the present invention to provide an airfoil blade characterized by airfoil sections having high lift-to-drag coefficients during aircraft cruise modes of operation.

It is another object of the present invention to provide an airfoil blade characterized by airfoil sections having high critical Mach numbers over an extensive operation range.

It is another object of the present invention to provide an airfoil blade characterized by airfoil shapes consistent with known propeller manufacturing techniques.

It is another object of the present invention to provide an airfoil blade having a shape which exhibits enhanced resistance to damage from both handling and impact with foreign objects.

In accordance with the present invention, an improved airfoil blade for aircraft propellers and the like is provided with novel airfoil sections along the length of the blade, the sections being characterized by rounded, generally parabolic leading edge portions fairing into pressure surfaces which, for thickness ratios less than approximately 0.15, are characterized by leading, convex protuberant portions which in turn fair into a concave trailing portions. For thickness ratios greater than approximately 0.15, the trailing pressure surfaces are slightly convex along their length. The leading edge portions also fair into convex suction surfaces which merge with the trailing pressure surfaces into slightly blunt trailing edges. The rounded leading edge portions at relatively high angles of attack and low Mach numbers and protuberant leading pressure surface portions at relatively low angles of attack and high Mach numbers tend to reduce the extent of turning of airflow over the airfoil surfaces thereby reducing local surface Mach numbers and maintaining lower pressure gradients than encountered in state of the art airfoil shapes. The slightly blunt trailing edge portion defines a trailing suction surface portion which exhibits a gradual pressure recovery thereby minimizing separation of flow from the suction surface. Enhanced aerodynamic performance is achieved at Mach numbers characteristic of tip speeds sufficiently low to achieve enhanced far-field and cabin noise minimization.

BRIEF DESCRIPTION OF THE DRAWINGS

FIG. 7 is an elevation of the NACA airfoil of FIG. 5 in takeoff, climb, and cruise modes of operation;

FIG. 8 is an elevation of one of the airfoils of FIG. 3 in takeoff, climb, and cruise modes of operation;

BEST MODE OF CARRYING OUT THE INVENTION

In general, propeller blade section thrust is characterized by the expression:

$$T \propto C_L b V^2$$

Wherein:
T is thrust,
$C_L$ is lift coefficient,
b is chord length of the section,
V is section relative velocity.

An examination of this expression indicates that as chord b is reduced for minimum weight, and section relative velocity V is reduced for low noise, section lift coefficient $C_L$ must be increased to maintain a given thrust. Accordingly, it is apparent that the lift coefficient must be maximized to achieve a given section thrust output when chord and section relative velocity are reduced for minimization of weight and noise. At the same time, it will be appreciated that for cruise modes of operation at low operating lift coefficients and high section Mach numbers, the airfoil sections must be characterized by high lift-to-drag ratios.

Figure 1:
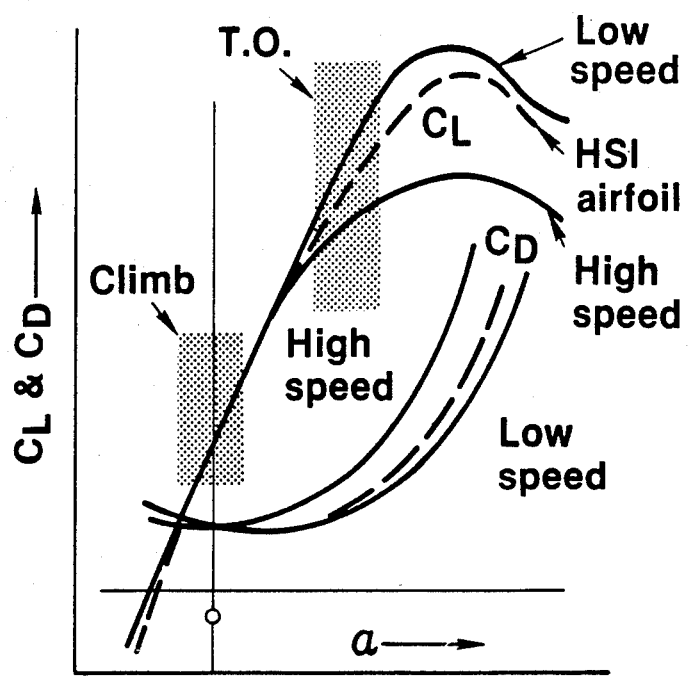
FIG. 1 is a graphical representation of takeoff and climb lift and drag performance of typical low and high-speed airfoils at various angles of attack.
Figure 2:
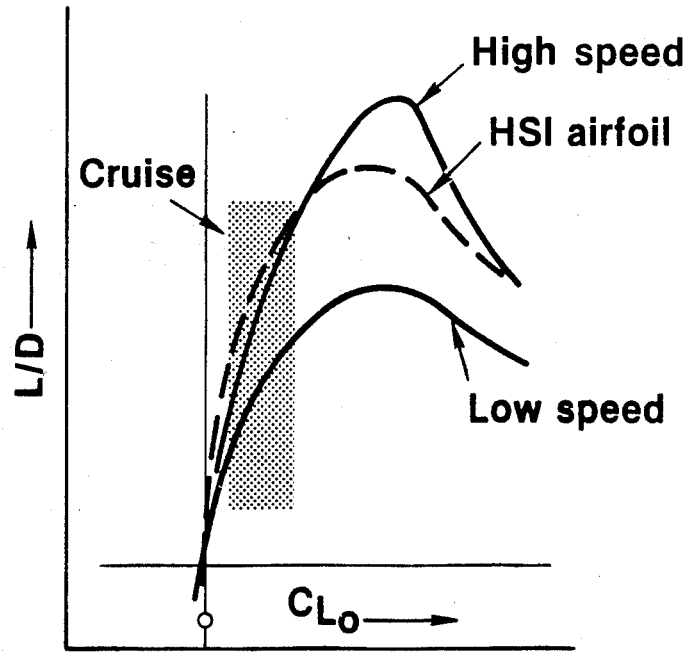
FIG. 2 is a graphical representation of the cruise performance (lift/drag) of typical high and low-speed airfoils at various values of lift coefficient.

Heretofore, it has been extremely difficult to achieve high aerodynamic performance at both takeoff and cruise conditions with an airfoil blade having cross-sectional shapes from an existing airfoil family. Referring to FIG. 1, the shaded regions of the curve are indicative of the performance output capabilities of a typical low speed airfoil and a typical high speed airfoil at lift coefficients representative of propeller takeoff (T.O.) and climb conditions. It is seen that a classic "low speed" airfoil exhibits a much greater lift coefficient and substantially less drag for takeoff conditions than a classic "high speed" airfoil and would therefore, be more desirable than the high speed airfoil. However, referring to FIG. 2, wherein the shaded region is indicative of the performance output capabilities of the same two airfoils at cruise modes of operation, it is seen that the high speed airfoil is much more desirable than the low speed airfoil, since it exhibits substantially higher lift to drag ratios at lift coefficients corresponding to normal cruise conditions. In FIGS. 1 and 2, the curves indicated by the dotted line exemplify the performance of the airfoil HS1 of the present invention. As is readily noted from these curves, this airfoil exhibits the takeoff and climb performance characteristics almost equal to the classic low speed airfoil and the cruise characteristics of the high speed airfoil, all in a single airfoil of a novel cross-sectional airfoil shape as shown in FIG. 3.

Figure 3:
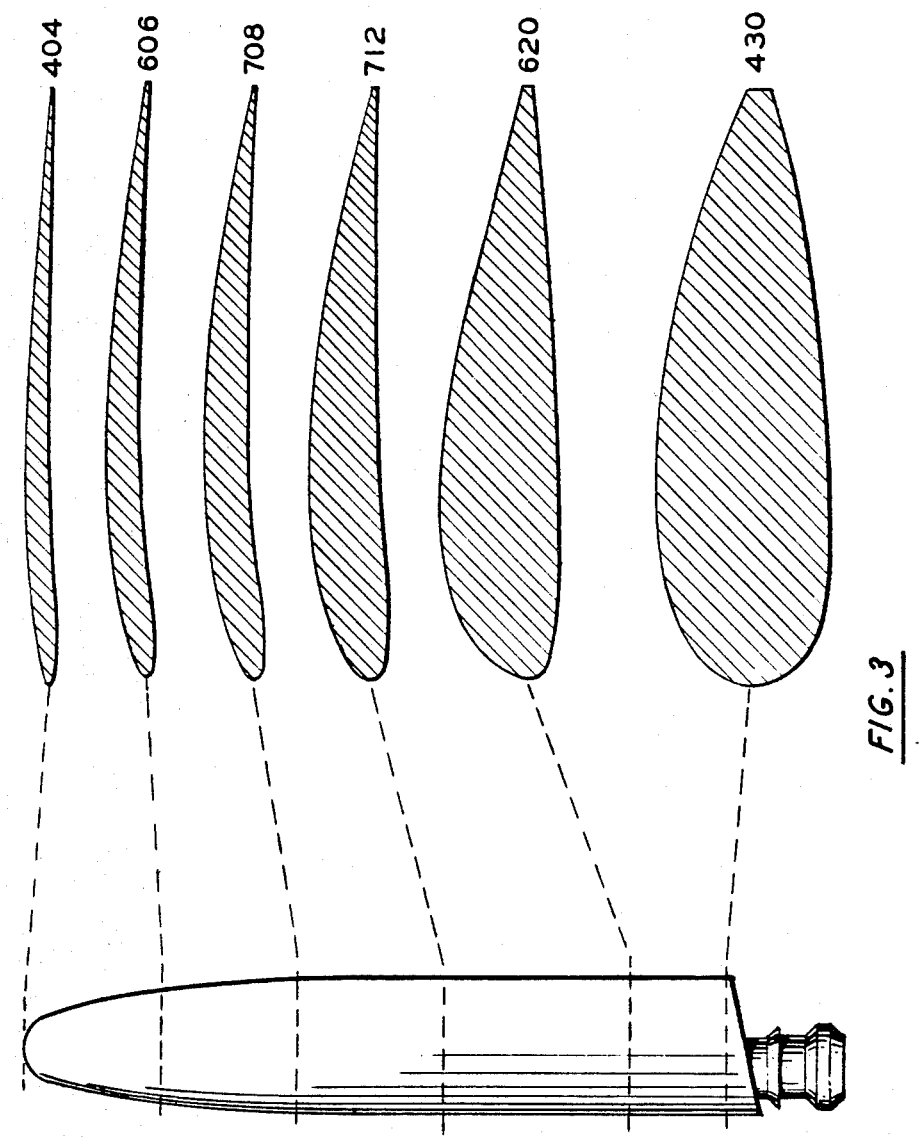
FIG. 3 is a series of cross-sectional elevations of the airfoil of the present invention and a plan view of a blade showing exemplary locations, along the blade axis of those sections, various of the airfoils being enlarged to show details of the shape thereof.

Referring to FIG. 3, a series of cross sections of the airfoil blade of the present invention are shown. Each cross section is identified by indicia comprising three numerals setting forth the design lift coefficient multiplied by 10 (first numeral) and the thickness coefficient multiplied by 100 (the last two numerals). Thus, for example, the uppermost airfoil section, is characterized by a design lift coefficient of 0.4 and a thickness ratio of 0.04, the second airfoil section having a design lift coefficient of 0.6 and a thickness ratio of 0.06, the third airfoil section having a design lift coefficient of 0.7 and a thickness ratio of 0.08, the fourth airfoil section having a design lift coefficient of 0.7 and a thickness ratio of 0.12, the fifth airfoil section having a design lift coefficient of 0.6 and a thickness ratio of 0.20 and the sixth airfoil having a design lift coefficient of 0.4 and a thickness ratio of 0.30. Still referring to FIG. 3, illustrative locations on a single propeller blade of the airfoil sections are shown. It is seen that the 404 airfoil section is taken substantially at the tip of the blade, the 430 section proximal to the blade root and the 620 section is taken at a location approximately 0.175 of the length of the blade longitudinal axis from the root portion thereof. The remaining sections are taken at approximately 0.425 of the length of the axis from the root thereof, 0.625 of the length of the axis and 0.825 the length of the axis. It will of course be understood that while the chords of the airfoil sections are illustrated as being of a common length, design considerations regarding blade taper will dictate the relative sizes of the airfoil sections and the present invention shall not be limited to any specific size relationship between the airfoil sections.

Those cross sections of the blade between the airfoil sections shown in FIG. 3 are defined by a transition surface connecting corresponding portions of any two adjacent airfoil shapes. The airfoil cross sections will, of course, be angularly displaced from one another in a manner well known in the art to impart sufficient twist to the blade to establish varying blade angles of attack dictated by aerodynamic performance requirements.

The following tables list precise dimensionless coordinates of a number of airfoil sections of the blade of the present invention wherein the x/c values are dimensionless locations on the blade chord line, y/c upper are the dimensionless heights from the chord line of points on the suction surface and y/c lower are the dimensionless heights from the chord line of points on the pressure surface.

TABLE I

| | HS1-404 | | | | |
|---|---|---|---|---|---|
| x/c | (y/c) upper | (y/c) lower | x/c | (y/c) upper | (y/c) lower |
| 0.00000 | 0.00009 | 0.00004 | 0.44000 | 0.04914 | 0.01116 |
| 0.00050 | 0.00171 | −0.00113 | 0.46000 | 0.04893 | 0.01129 |
| 0.00100 | 0.00250 | −0.00155 | 0.48000 | 0.04860 | 0.01137 |
| 0.00200 | 0.00372 | −0.00210 | 0.50000 | 0.04818 | 0.01139 |
| 0.00300 | 0.00470 | −0.00253 | 0.54000 | 0.04705 | 0.01132 |
| 0.00500 | 0.00628 | −0.00323 | 0.56000 | 0.04635 | 0.01122 |
| 0.00750 | 0.00788 | −0.00395 | 0.58000 | 0.04555 | 0.01108 |
| 0.01000 | 0.00923 | −0.00455 | 0.60000 | 0.04461 | 0.01091 |
| 0.02000 | 0.01339 | −0.00620 | 0.64000 | 0.04223 | 0.01043 |
| 0.03000 | 0.01655 | −0.00709 | 0.66000 | 0.04076 | 0.01010 |
| 0.04000 | 0.01922 | −0.00751 | 0.68000 | 0.03911 | 0.00971 |
| 0.05000 | 0.02158 | −0.00761 | 0.70000 | 0.03728 | 0.00924 |
| 0.06000 | 0.02375 | −0.00756 | 0.74000 | 0.03319 | 0.00809 |

TABLE I-continued

HS1-404

| x/c | (y/c) upper | (y/c) lower | x/c | (y/c) upper | (y/c) lower |
|---|---|---|---|---|---|
| 0.07000 | 0.02577 | −0.00724 | 0.76000 | 0.03097 | 0.00741 |
| 0.08000 | 0.02766 | −0.00686 | 0.78000 | 0.02867 | 0.00668 |
| 0.09000 | 0.02943 | −0.00639 | 0.80000 | 0.02631 | 0.00591 |
| 0.10000 | 0.03107 | −0.00584 | 0.82000 | 0.02389 | 0.00512 |
| 0.12000 | 0.03403 | −0.00451 | 0.84000 | 0.02143 | 0.00429 |
| 0.14000 | 0.03659 | −0.00295 | 0.86000 | 0.01892 | 0.00343 |
| 0.16000 | 0.03883 | −0.00123 | 0.88000 | 0.01637 | 0.00252 |
| 0.18000 | 0.04077 | 0.00055 | 0.90000 | 0.01376 | 0.00156 |
| 0.20000 | 0.04244 | 0.00230 | 0.91000 | 0.01243 | 0.00106 |
| 0.22000 | 0.04386 | 0.00393 | 0.92000 | 0.01108 | 0.00054 |
| 0.24000 | 0.04504 | 0.00536 | 0.93000 | 0.00970 | 0.00000 |
| 0.26000 | 0.04601 | 0.00658 | 0.94000 | 0.00829 | −0.00054 |
| 0.28000 | 0.04680 | 0.00758 | 0.95000 | 0.00684 | −0.00110 |
| 0.30000 | 0.04745 | 0.00840 | 0.95000 | 0.00536 | −0.00167 |
| 0.34000 | 0.04844 | 0.00961 | 0.97000 | 0.00384 | −0.00225 |
| 0.36000 | 0.04880 | 0.01007 | 0.98000 | 0.00229 | −0.00285 |
| 0.38000 | 0.04906 | 0.01044 | 0.99000 | 0.00070 | −0.00346 |
| 0.40000 | 0.04920 | 0.01074 | 1.00000 | −0.00092 | −0.00408 |

TABLE II

HS1-606

| x/c | (y/c) upper | (y/c) lower | x/c | (y/c) upper | (y/c) lower |
|---|---|---|---|---|---|
| 0.00000 | 0.00015 | 0.00015 | 0.44000 | 0.07100 | 0.01387 |
| 0.00050 | 0.00259 | −0.00162 | 0.46000 | 0.07069 | 0.01406 |
| 0.00100 | 0.00379 | −0.00220 | 0.48000 | 0.07021 | 0.01419 |
| 0.00200 | 0.00562 | −0.00296 | 0.50000 | 0.06959 | 0.01425 |
| 0.00300 | 0.00708 | −0.00354 | 0.54000 | 0.06796 | 0.01420 |
| 0.00500 | 0.00938 | −0.00455 | 0.56000 | 0.06695 | 0.01409 |
| 0.00750 | 0.01164 | −0.00563 | 0.58000 | 0.06578 | 0.01394 |
| 0.01000 | 0.01352 | −0.00656 | 0.60000 | 0.06442 | 0.01373 |
| 0.02000 | 0.01926 | −0.00925 | 0.64000 | 0.06098 | 0.01314 |
| 0.03000 | 0.02371 | −0.01079 | 0.66000 | 0.05886 | 0.01273 |
| 0.04000 | 0.02756 | −0.01160 | 0.68000 | 0.05647 | 0.01224 |
| 0.05000 | 0.03105 | −0.01190 | 0.70000 | 0.05383 | 0.01165 |
| 0.06000 | 0.03429 | −0.01187 | 0.74000 | 0.04794 | 0.01018 |
| 0.07000 | 0.03731 | −0.01161 | 0.76000 | 0.04474 | 0.00930 |
| 0.08000 | 0.04012 | −0.01118 | 0.78000 | 0.04142 | 0.00835 |
| 0.09000 | 0.04273 | −0.01060 | 0.80000 | 0.03802 | 0.00734 |
| 0.10000 | 0.04515 | −0.00988 | 0.82000 | 0.03453 | 0.00530 |
| 0.12000 | 0.04946 | −0.00807 | 0.84000 | 0.03099 | 0.00522 |
| 0.14000 | 0.05318 | −0.00588 | 0.86000 | 0.02738 | 0.00408 |
| 0.16000 | 0.05638 | −0.00347 | 0.88000 | 0.02371 | 0.00288 |
| 0.18000 | 0.05915 | −0.00099 | 0.90000 | 0.01996 | 0.00161 |
| 0.20000 | 0.06153 | 0.00143 | 0.91000 | 0.01804 | 0.00094 |
| 0.22000 | 0.06354 | 0.00367 | 0.92000 | 0.01616 | 0.00025 |
| 0.24000 | 0.06522 | 0.00565 | 0.93000 | 0.01411 | −0.00046 |
| 0.26000 | 0.06659 | 0.00734 | 0.94000 | 0.01209 | −0.00119 |
| 0.28000 | 0.06772 | 0.00875 | 0.95000 | 0.01001 | −0.00193 |
| 0.30000 | 0.06865 | 0.00992 | 0.96000 | 0.00788 | −0.00289 |
| 0.34000 | 0.07005 | 0.01167 | 0.97000 | 0.00570 | −0.00346 |
| 0.36000 | 0.07056 | 0.01231 | 0.98000 | 0.00346 | −0.00425 |
| 0.38000 | 0.07092 | 0.01284 | 1.99000 | 0.00118 | −0.00508 |
| 0.40000 | 0.07112 | 0.01326 | 1.00000 | −0.00115 | −0.00589 |

TABLE III

HS1-708

| x/c | (y/c) upper | (y/c) lower | x/c | (y/c) upper | (y/c) lower |
|---|---|---|---|---|---|
| 0.00000 | 0.00013 | 0.00013 | 0.44000 | 0.08681 | 0.01060 |
| 0.00050 | 0.00330 | −0.00244 | 0.46000 | 0.08640 | 0.01087 |
| 0.00100 | 0.00479 | −0.00338 | 0.48000 | 0.08579 | 0.01106 |
| 0.00200 | 0.00704 | −0.00485 | 0.50000 | 0.08502 | 0.01120 |
| 0.00300 | 0.00883 | −0.00561 | 0.54000 | 0.08301 | 0.01129 |
| 0.00500 | 0.01173 | −0.00715 | 0.56000 | 0.08176 | 0.01125 |
| 0.00750 | 0.01461 | −0.00865 | 0.58000 | 0.08033 | 0.01118 |
| 0.01000 | 0.01704 | −0.00990 | 0.60000 | 0.07865 | 0.01105 |
| 0.02000 | 0.02448 | −0.01322 | 0.64000 | 0.07443 | 0.01065 |
| 0.03000 | 0.03017 | −0.01506 | 0.66000 | 0.07184 | 0.01034 |
| 0.04000 | 0.03501 | −0.01603 | 0.68000 | 0.06892 | 0.00996 |
| 0.05000 | 0.03932 | −0.01645 | 0.70000 | 0.06570 | 0.00947 |
| 0.06000 | 0.04326 | −0.01650 | 0.74000 | 0.05853 | 0.00818 |
| 0.07000 | 0.04692 | −0.01629 | 0.76000 | 0.05465 | 0.00738 |

TABLE III-continued

HS1-708

| x/c | (y/c) upper | (y/c) lower | x/c | (y/c) upper | (y/c) lower |
|---|---|---|---|---|---|
| 0.08000 | 0.05031 | −0.01588 | 0.78000 | 0.05062 | 0.00650 |
| 0.09000 | 0.05344 | −0.01530 | 0.80000 | 0.04649 | 0.00557 |
| 0.10000 | 0.05634 | −0.01456 | 0.82000 | 0.04221 | 0.00459 |
| 0.12000 | 0.06151 | −0.01271 | 0.84000 | 0.03798 | 0.00356 |
| 0.14000 | 0.06595 | −0.01050 | 0.86000 | 0.03360 | 0.00248 |
| 0.16000 | 0.06977 | −0.00808 | 0.88000 | 0.02916 | 0.00133 |
| 0.18000 | 0.07308 | −0.00559 | 0.90000 | 0.02462 | 0.00006 |
| 0.20000 | 0.07687 | −0.00319 | 0.91000 | 0.02231 | −0.00058 |
| 0.22000 | 0.07824 | −0.00092 | 0.92000 | 0.01996 | −0.00128 |
| 0.24000 | 0.08021 | −0.00113 | 0.93000 | 0.01757 | −0.00196 |
| 0.26000 | 0.08182 | −0.00293 | 0.94000 | 0.01512 | −0.00268 |
| 0.28000 | 0.08313 | −0.00450 | 0.95000 | 0.01262 | −0.00341 |
| 0.30000 | 0.08421 | 0.00833 | 0.96000 | 0.01005 | −0.00416 |
| 0.34000 | 0.08583 | 0.00791 | 0.97000 | 0.00741 | −0.00493 |
| 0.36000 | 0.08640 | 0.00868 | 0.98000 | 0.00471 | −0.00572 |
| 0.38000 | 0.08680 | 0.00932 | 0.99000 | 0.00196 | −0.00652 |
| 0.40000 | 0.08701 | 0.00984 | 1.00000 | −0.00086 | −0.00734 |

TABLE IV

HS1-712

| x/c | (y/c) upper | (y/c) lower | x/c | (y/c) upper | (y/c) lower |
|---|---|---|---|---|---|
| 0.00000 | 0.00001 | 0.00000 | 0.44000 | 0.10556 | −0.01105 |
| 0.00050 | 0.00430 | −0.00377 | 0.46000 | 0.10600 | −0.01060 |
| 0.00100 | 0.00600 | −0.00519 | 0.48000 | 0.10526 | −0.01020 |
| 0.00200 | 0.00903 | −0.00709 | 0.50000 | 0.10423 | −0.00985 |
| 0.00300 | 0.01127 | −0.00842 | 0.54000 | 0.10154 | −0.00919 |
| 0.00500 | 0.01490 | −0.01044 | 0.56000 | 0.09965 | −0.00888 |
| 0.00750 | 0.01861 | −0.01230 | 0.58000 | 0.09795 | −0.00856 |
| 0.01000 | 0.02180 | −0.01376 | 0.60000 | 0.09587 | −0.00824 |
| 0.02000 | 0.03186 | −0.01767 | 0.64000 | 0.09125 | −0.00756 |
| 0.03000 | 0.03967 | −0.02006 | 0.66000 | 0.08872 | −0.00721 |
| 0.04000 | 0.04688 | −0.02109 | 0.68000 | 0.08605 | −0.00687 |
| 0.05000 | 0.05192 | −0.02283 | 0.70000 | 0.08322 | −0.00658 |
| 0.06000 | 0.06698 | −0.02353 | 0.74000 | 0.07789 | −0.00619 |
| 0.07000 | 0.00651 | −0.02417 | 0.76000 | 0.07677 | −0.00611 |
| 0.08000 | 0.06562 | −0.02450 | 0.78000 | 0.07028 | −0.00809 |
| 0.09000 | 0.06937 | −0.02466 | 0.80000 | 0.06668 | −0.00611 |
| 0.10000 | 0.07280 | −0.02469 | 0.82000 | 0.06262 | −0.00614 |
| 0.12000 | 0.07886 | −0.02440 | 0.84000 | 0.05834 | −0.00621 |
| 0.14000 | 0.08901 | −0.02374 | 0.86000 | 0.08368 | −0.00633 |
| 0.16000 | 0.08839 | −0.02279 | 0.88000 | 0.04856 | −0.00653 |
| 0.18000 | 0.09211 | −0.02159 | 0.90000 | 0.04299 | −0.00683 |
| 0.20000 | 0.09625 | −0.02030 | 0.91000 | 0.03997 | −0.00701 |
| 0.22000 | 0.09786 | −0.01901 | 0.92000 | 0.03686 | −0.00721 |
| 0.24000 | 0.01000 | −0.01786 | 0.93000 | 0.03364 | −0.00742 |
| 0.26000 | 0.10173 | −0.01688 | 0.94000 | 0.03032 | −0.00753 |
| 0.28000 | 0.10313 | −0.01607 | 0.95000 | 0.02889 | −0.00785 |
| 0.30000 | 0.10428 | −0.01536 | 0.96000 | 0.02335 | −0.00807 |
| 0.34000 | 0.10542 | −0.01489 | 0.97000 | 0.01968 | −0.00829 |
| 0.36000 | 0.10632 | −0.01344 | 0.98000 | 0.01970 | −0.00882 |
| 0.38000 | 0.10587 | −0.01279 | 0.99000 | 0.01971 | −0.00576 |
| 0.40000 | 0.10700 | −0.01216 | 1.00000 | 0.00720 | −0.00700 |

TABLE V

HS1-620

| x/c | (y/c) upper | (y/c) lower | x/c | (y/c) upper | (y/c) lower |
|---|---|---|---|---|---|
| 0.00000 | 0.00001 | 0.00001 | 0.44000 | 0.13904 | −0.05705 |
| 0.00050 | 0.00694 | −0.00650 | 0.46000 | 0.13814 | −0.05626 |
| 0.00100 | 0.00993 | −0.00907 | 0.48000 | 0.13699 | −0.05545 |
| 0.00200 | 0.01424 | −0.01258 | 0.50000 | 0.13556 | −0.05459 |
| 0.00300 | 0.01760 | −0.01520 | 0.54000 | 0.13189 | −0.05269 |
| 0.00500 | 0.02300 | −0.01922 | 0.56000 | 0.12963 | −0.05161 |
| 0.00750 | 0.02845 | −0.02308 | 0.58000 | 0.12711 | −0.05045 |
| 0.01000 | 0.03306 | −0.02621 | 0.60000 | 0.12435 | −0.04919 |
| 0.02000 | 0.04737 | −0.03521 | 0.64000 | 0.11823 | −0.04645 |
| 0.03000 | 0.05820 | −0.04139 | 0.66000 | 0.11489 | −0.04499 |
| 0.04000 | 0.06713 | −0.04609 | 0.68000 | 0.11138 | −0.04348 |
| 0.05000 | 0.07477 | −0.04983 | 0.70000 | 0.10770 | −0.04197 |
| 0.06000 | 0.08147 | −0.05289 | 0.74000 | 0.09981 | −0.03900 |
| 0.07000 | 0.08742 | −0.05541 | 0.76000 | 0.09560 | −0.03755 |
| 0.08000 | 0.09274 | −0.05751 | 0.78000 | 0.09118 | −0.03610 |

TABLE V-continued

HS1-620

| x/c | (y/c) upper | (y/c) lower | x/c | (y/c) upper | (y/c) lower |
|---|---|---|---|---|---|
| 0.09000 | 0.09755 | −0.05925 | 0.80000 | 0.08651 | −0.03462 |
| 0.10000 | 0.10190 | −0.06070 | 0.82000 | 0.08153 | −0.03307 |
| 0.12000 | 0.10943 | −0.06280 | 0.84000 | 0.07616 | −0.03144 |
| 0.14000 | 0.11566 | −0.06404 | 0.86000 | 0.07031 | −0.02972 |
| 0.16000 | 0.12079 | −0.06459 | 0.88000 | 0.06391 | −0.02790 |
| 0.18000 | 0.12501 | −0.06463 | 0.90000 | 0.05693 | −0.02600 |
| 0.20000 | 0.12844 | −0.06430 | 0.91000 | 0.05322 | −0.02502 |
| 0.22000 | 0.13121 | −0.06376 | 0.92000 | 0.04939 | −0.02401 |
| 0.24000 | 0.13344 | −0.06317 | 0.93000 | 0.04545 | −0.02297 |
| 0.26000 | 0.13524 | −0.06261 | 0.94000 | 0.04142 | −0.02189 |
| 0.28000 | 0.13670 | −0.06211 | 0.95000 | 0.03727 | −0.02078 |
| 0.30000 | 0.13789 | −0.06163 | 0.96000 | 0.03295 | −0.01963 |
| 0.34000 | 0.13955 | −0.06061 | 0.97000 | 0.02840 | −0.01843 |
| 0.36000 | 0.14000 | −0.06000 | 0.98000 | 0.02353 | −0.01716 |
| 0.38000 | 0.14017 | −0.05932 | 0.99000 | 0.01831 | −0.01580 |
| 0.40000 | 0.14007 | −0.05859 | 1.00000 | 0.01272 | −0.01427 |

TABLE VI

HS1-430

| x/c | (y/c) upper | (y/c) lower | x/c | (y/c) upper | (y/c) lower |
|---|---|---|---|---|---|
| 0.00000 | 0.00000 | 0.00001 | 0.44000 | 0.17626 | 0.11742 |
| 0.00050 | 0.01024 | −0.00991 | 0.46000 | 0.17497 | −0.11622 |
| 0.00100 | 0.01456 | −0.01393 | 0.48000 | 0.17342 | −0.11489 |
| 0.00200 | 0.02071 | −0.01951 | 0.50000 | 0.17156 | −0.11340 |
| 0.00300 | 0.02547 | −0.02372 | 0.54000 | 0.16680 | −0.10987 |
| 0.00500 | 0.03303 | −0.03028 | 0.56000 | 0.16388 | −0.10780 |
| 0.00750 | 0.04057 | −0.03668 | 0.58000 | 0.16062 | −0.10553 |
| 0.01000 | 0.04692 | −0.04196 | 0.60000 | 0.15707 | −0.10307 |
| 0.02000 | 0.06627 | −0.05751 | 0.64000 | 0.14920 | −0.09765 |
| 0.03000 | 0.08068 | −0.06858 | 0.66000 | 0.14493 | −0.09472 |
| 0.04000 | 0.09241 | −0.07728 | 0.68000 | 0.14045 | −0.09168 |
| 0.05000 | 0.01235 | −0.08441 | 0.70000 | 0.13577 | −0.08857 |
| 0.06000 | 0.11097 | −0.09041 | 0.74000 | 0.12588 | −0.08220 |
| 0.07000 | 0.11857 | −0.09554 | 0.76000 | 0.12064 | −0.07895 |
| 0.08000 | 0.12534 | −0.09995 | 0.78000 | 0.11518 | −0.07562 |
| 0.09000 | 0.13138 | −0.10376 | 0.80000 | 0.10942 | −0.07216 |
| 0.10000 | 0.13680 | −0.10707 | 0.82000 | 0.10329 | −0.06850 |
| 0.12000 | 0.14595 | −0.11231 | 0.84000 | 0.09670 | −0.06459 |
| 0.14000 | 0.15325 | −0.11605 | 0.86000 | 0.08955 | −0.06040 |
| 0.16000 | 0.15904 | −0.11859 | 0.88000 | 0.08178 | −0.05590 |
| 0.18800 | 0.16517 | −0.12064 | 0.90000 | 0.07334 | −0.05109 |
| 0.20000 | 0.16723 | −0.12114 | 0.91000 | 0.06385 | −0.04855 |
| 0.22000 | 0.17011 | −0.12164 | 0.92000 | 0.06420 | −0.04594 |
| 0.24000 | 0.17243 | −0.12190 | 0.93000 | 0.05938 | −0.04323 |
| 0.26000 | 0.17433 | −0.12202 | 0.94000 | 0.05440 | −0.04043 |
| 0.28000 | 0.17587 | −0.12204 | 0.95000 | 0.04927 | −0.03754 |
| 0.30000 | 0.17708 | −0.12197 | 0.96000 | 0.04396 | −0.03455 |
| 0.34000 | 0.17851 | −0.12145 | 0.97000 | 0.03846 | −0.03145 |
| 0.36000 | 0.17872 | −0.12096 | 0.98000 | 0.03267 | −0.02818 |
| 0.38000 | 0.17857 | −0.12030 | 0.99000 | 0.02649 | −0.02467 |
| 0.40000 | 0.17808 | −0.11948 | 1.00000 | 0.01969 | −0.02080 |

Figure 4:
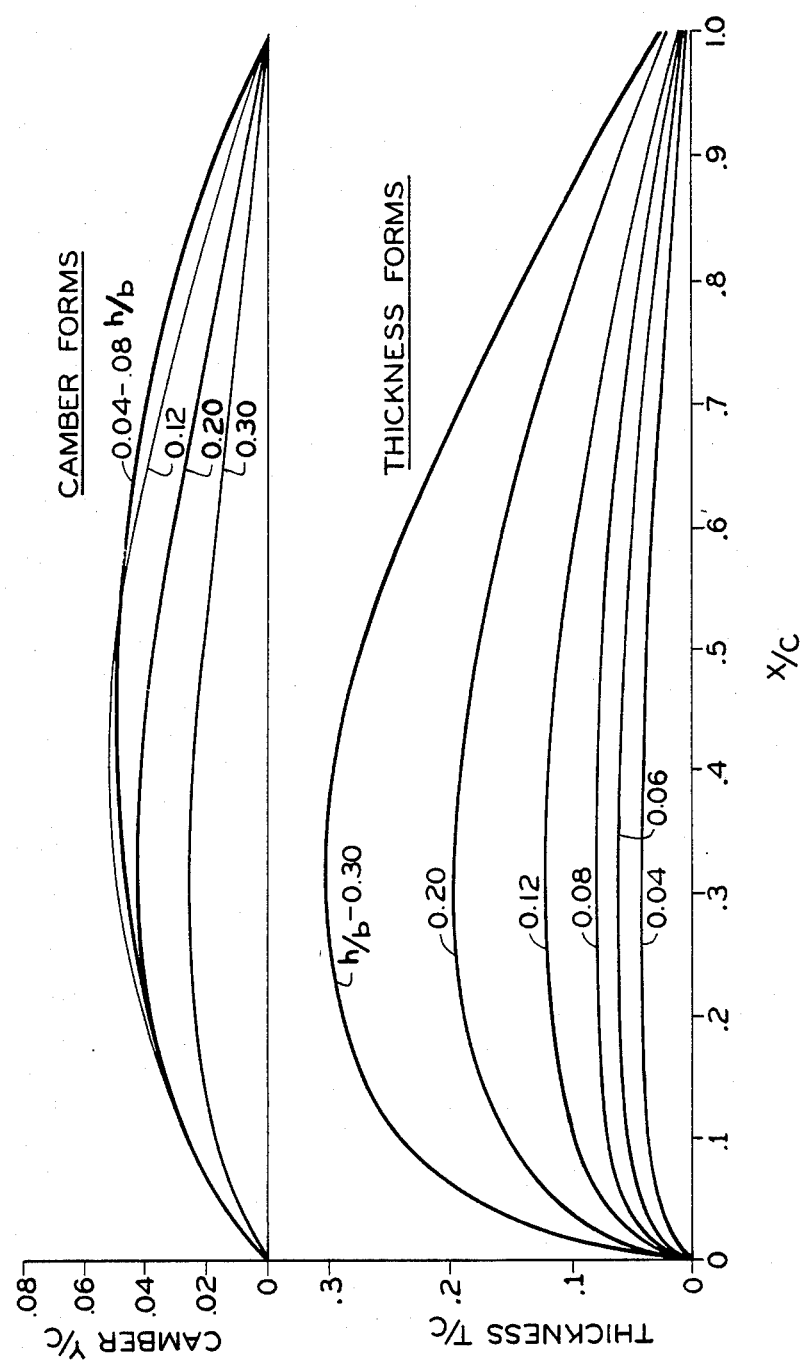
FIG. 4 is a graphical representation of the camber lines and thicknesses of a family of airfoil shapes within which the airfoils of FIG. 3 are included.

FIG. 4 is a graphical representation of the camber and thickness lines of various airfoil sections of the present invention, x/c being indicative of dimensionless locations on the chord line, y/c being indicative of the dimensionless height of the camber line from the airfoil chord and t/c being the total dimensionless thickness of the airfoil at the corresponding chord location. h/b indicates the thickness ratios of the various airfoil sections.

Each airfoil section has a unique location of maximum thickness and camber and when these airfoils are incorporated in a single propeller blade, smooth, continuous upper and lower surfaces result.

The airfoils are characterized as follows. The 0.04 thickness ratio airfoil has a maximum thickness at approximately 0.35 x/c and a maximum camber at approximately 0.50 x/c. The 0.06 thickness ratio airfoil has a maximum thickness at approximately 0.34 x/c and a maximum camber at approximately 0.5 x/c. The 0.08 thickness ratio airfoil has a maximum thickness at approximately 0.33 x/c and a maximum camber at approximately 0.50 x/c. The 0.12 thickness ratio airfoil has a maximum thickness at approximately 0.32 x/c and a maximum camber at approximately 0.38 x/c. The 0.20 thickness ratio airfoil has a maximum thickness at approximately 0.315 x/c and a maximum camber at 0.30 x/c. The 0.30 thickness ratio airfoil has a maximum thickness at approximately 0.310 x/c and a maximum camber at approximately 0.29 x/c. Each of the airfoils is further characterized by a trailing edge thickness equal to approximately 10% of the maximum section thickness.

Figure 5:
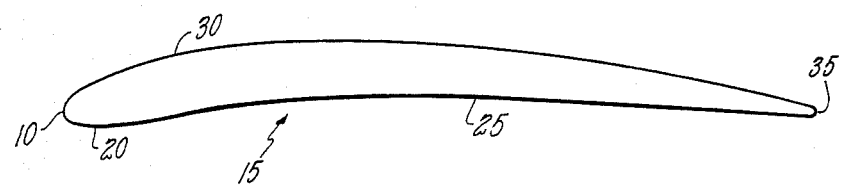
FIG. 5 is a cross-sectional elevation of one of the airfoils illustrated in FIG. 3.

From the foregoing and referring to FIG. 5 which illustrates the 708 airfoil, it is seen that the airfoils of the present invention are characterized along substantially the entire length of the chord thereof by cross-sectional airfoil shapes, each comprising a rounded generally parabolic leading edge portion 10 fairing into a pressure surface 15 having a leading convex portion 20 which fairs into a trailing portion 25. The leading portion also fairs into a convex suction surface 30, the pressure and suction surfaces merging into a slightly blunt trailing edge 35. As shown in FIG. 3, for thickness ratios less than approximately 0.15 the trailing portion 25 of the pressure surface is concave in shape thus defining the leading portion of the pressure surface as being of a protuberant nature. At such thickness ratios, the convex protuberant portion fairs into the concave trailing portion at a distance from the airfoil leading edge of approximately 10–15% of the airfoil chord length. At thickness ratios greater than 0.15 trailing portion 25 is convex.

It is also noted that the relatively rounded leading edge of the airfoil of the present invention minimizes the risk of damage due to normal handling and impact with foreign objects.

Figure 6:
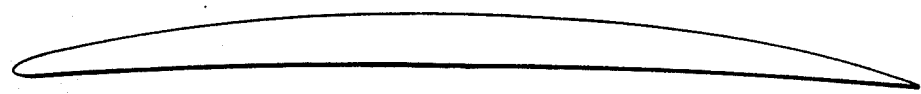
FIG. 6 is a cross-sectional elevation of a prior art NACA Series 16 airfoil.

FIG. 6 is illustrative of the general shape of an NACA Series 16 airfoil, a shape used widely in propeller blades of present day turbo-prop powered commuter aircraft. It is seen that the shapes of the airfoils of the present invention are readily distinguishable from the shape of the Series 16 airfoil. It is first noted that the Series 16 airfoil includes a concave pressure surface along the entire blade chord while the airfoil shapes of the blade of the present invention include the convex portion extending at least along the leading 10–15% of the blade pressure surface. It is also seen that the NACA Series 16 airfoil includes a relatively sharp leading edge portion while the airfoil shapes of the present invention, especially those shapes of a thickness ratio greater than 0.06 include rounded leading edge portions and relatively blunt trailing edges for higher critical Mach numbers at leading portions thereof and enhanced pressure recovery at the trailing portions thereof.

The enhanced performance of the airfoil of the present invention (HS1) is compared with the performance of the conventional NACA Series 16 airfoil in FIGS. 7 and 8. As shown in FIG. 7, on takeoff, at high angles of attack, the sharp nose of the Series 16 airfoil produces a shock at the leading edge which causes extensive separation of the boundary layer along the suction surface of the blade, the airfoil of the present invention having a much rounder leading edge does not establish such high local Mach numbers and therefore maintains a gentler pressure gradient which permits the boundary layer to remain attached throughout most normal angles of attack. It is noted from FIGS. 7 and 8 that a climb conditions, both airfoils perform reasonably well, each operating at its design lift coefficient. However, in cruise modes of operation, the airfoils are operating at low lift coefficients and high Mach numbers. In this case, the highly cambered NACA Series 16 airfoil operates "nose down" to the relative air velocity, the sharp nose of this airfoil producing a leading edge shock on the pressure side of the airfoil causing boundary layer thickening or separation over the forward portion of the airfoil, thereby adversely affecting effficiency (lift/drag) ratios. On the other hand, the more rounded leading edge portion and the protuberant leading pressure surface portion of the airfoil of the present invention results in lower Mach numbers under cruise conditions with no strong shock waves and therefore no associated forward boundary layer thickening or separation. As the data which follow indicates, the efficiency of a propeller defined by the airfoil blades of the present invention represents at least a 2–4% increase in takeoff efficiency and a 1–2% increase in cruise efficiency.

Figure 9:
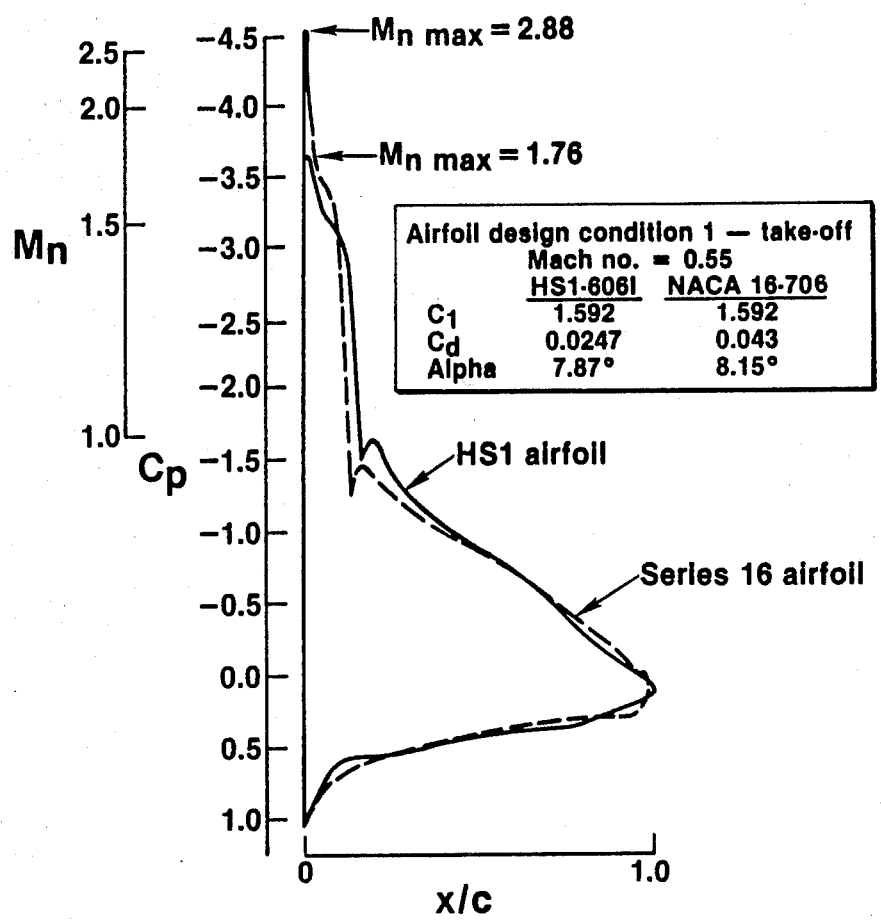
FIGS. 9, 10, 11 and 12 are plots of pressure coefficient and Mach number along the pressure and suction surfaces of one of the airfoil sections of the blade of the present invention and a corresponding NACA Series 16 airfoil.
Figure 10:
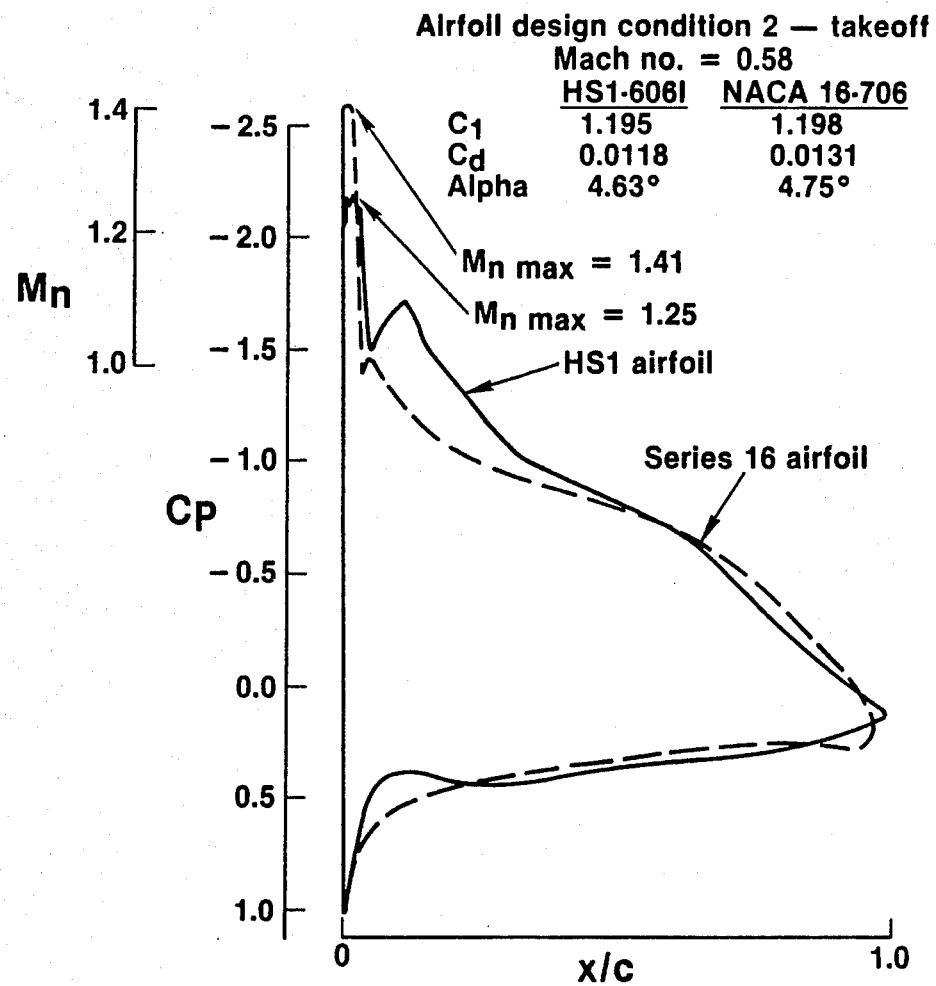
Figure 11:
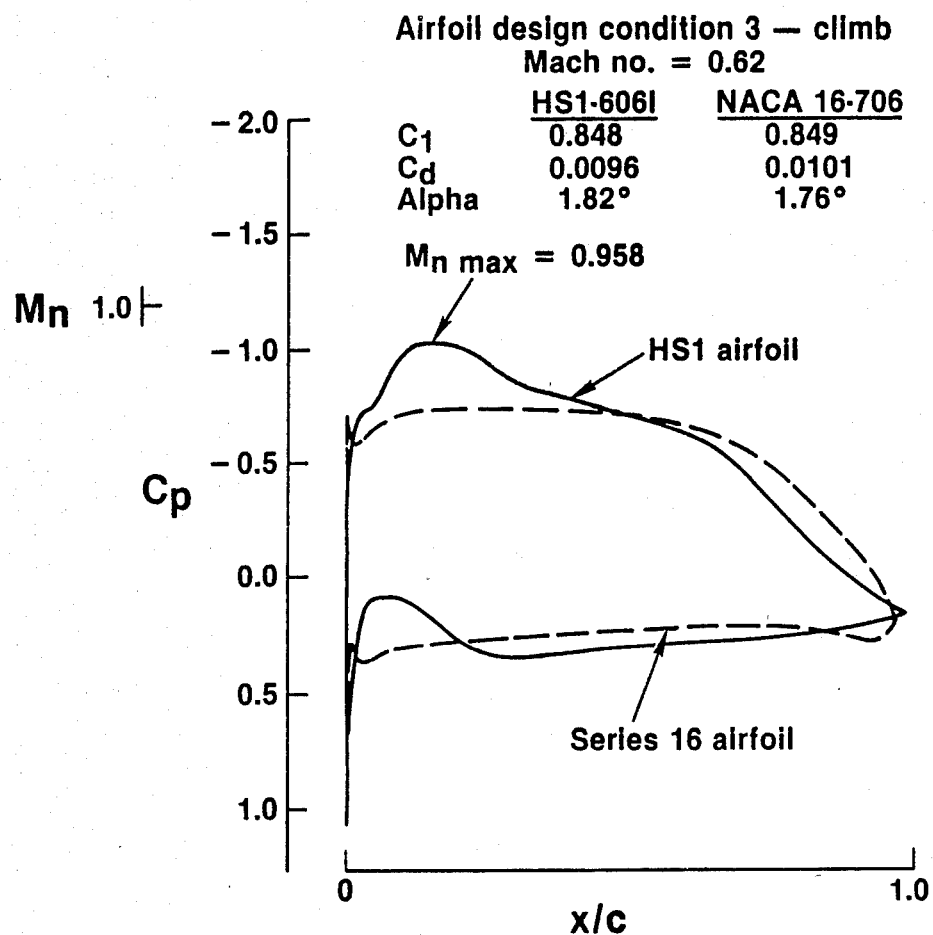
Figure 12:
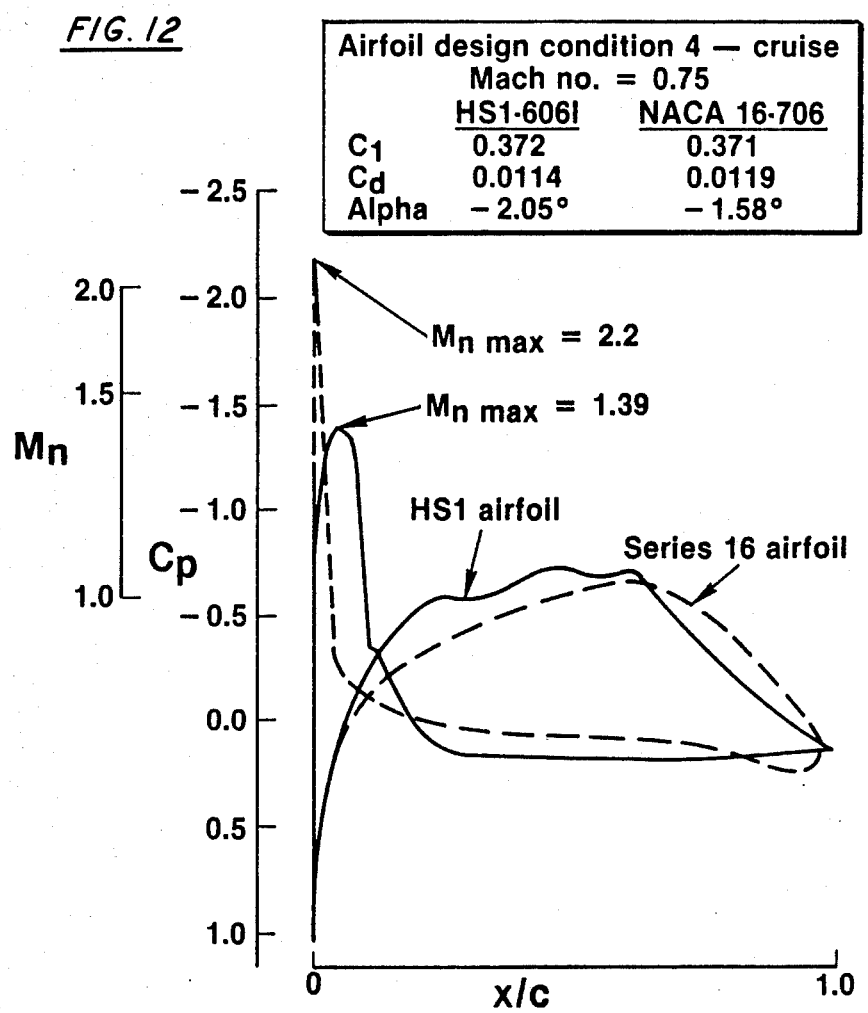

Referring to FIGS. 9 through 12, each of the Figs. illustrates the variation in pressure coefficient, $C_p$ along the airfoil chord, x/c for both a representative airfoil shape of the present invention and a close corresponding NACA Series 16 blade. It should be noted that as shown in FIG. 9, the Series 16 airfoil develops a very large leading edge Mach spike when operated in a takeoff condition at high positive angles of attack (FIG. 9) and high negative angles of attack required in a cruise (FIG. 12) mode of operation due to the relatively sharp leading edge of this airfoil. Experience has shown that a surface Mach number in excess of 1.3–1.4 most often results in a strong shock wave resulting in boundary layer separation and inefficient performance. Thus, in FIGS. 9 and 12, the 2.88 and 2.2 Mach numbers experienced by the Series 16 airfoil most likely result in separation and the poor performance resulting therefrom. On the other hand, it is noted that the peak surface Mach numbers for the airfoils of the present invention are much lower, only the surface Mach number at takeoff exceeding the desired 1.3 to 1.4 Mach number range. However, the gradual pressure recovery over the aft portion of the airfoil suction surface indicated by the upper righthand portions of the curves in FIGS. 9–12 indicates that flow separation is probably minimized despite the surface Mach number of 1.76 during takeoff conditions for the HS1 airfoil.

Figures 13, 14:
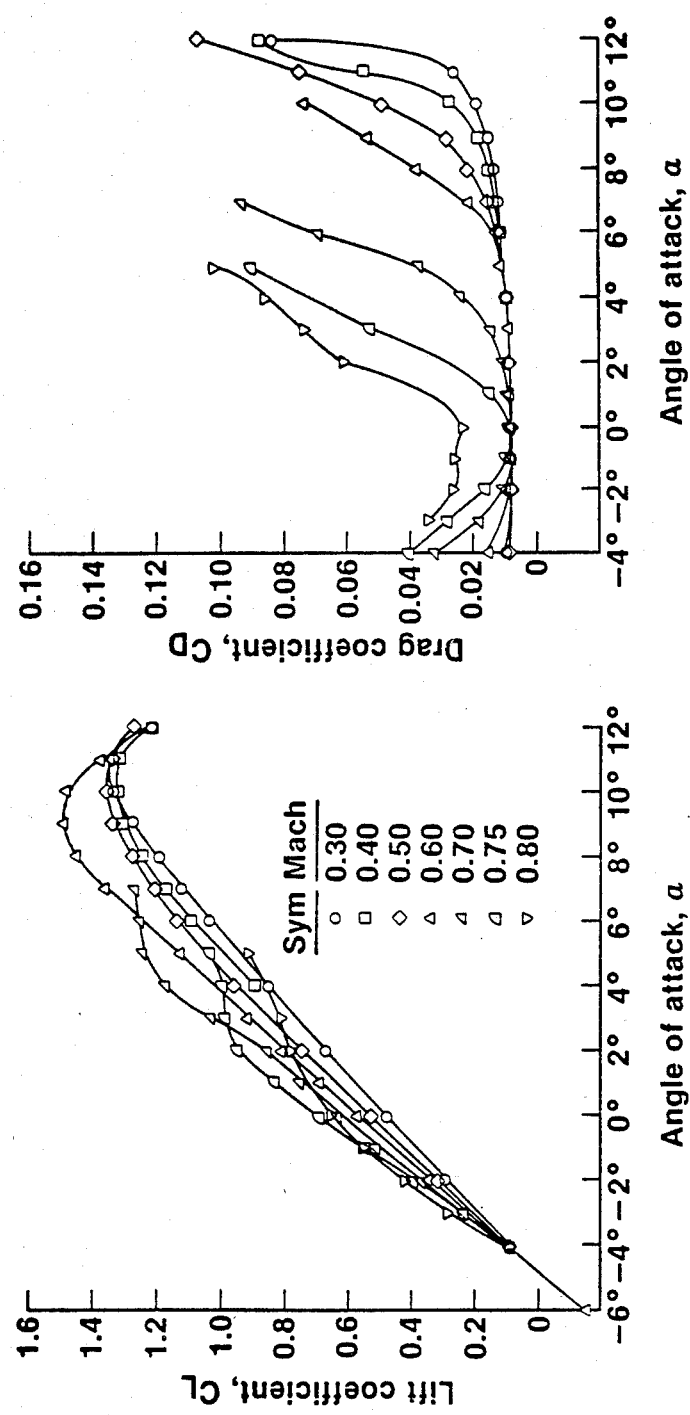
FIGS. 13 and 14 are plots of lift and drag coefficients respectively, for one of the airfoil sections of the blade of the present invention for various angles of attack.
Figure 16:
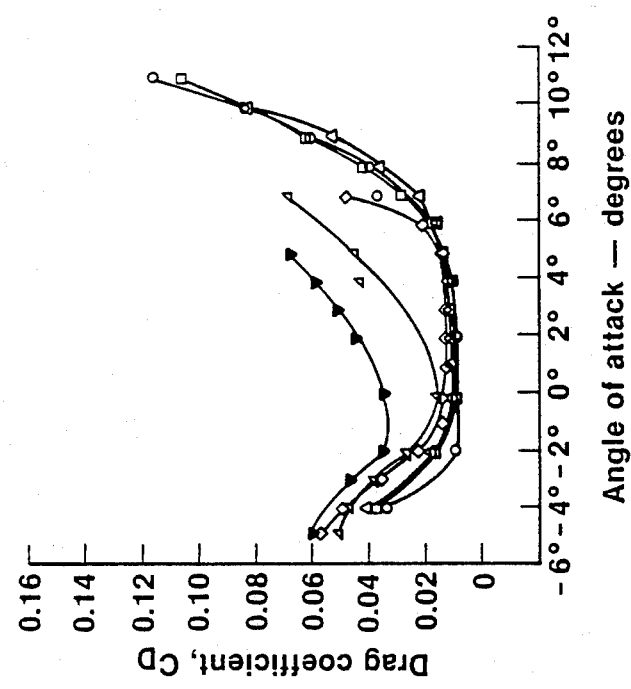
FIGS. 15 and 16 are plots of lift and drag coefficients respectively, similar to those of FIGS. 13 and 14 for a prior art corresponding NACA Series 16 airfoil.
Figure 15:
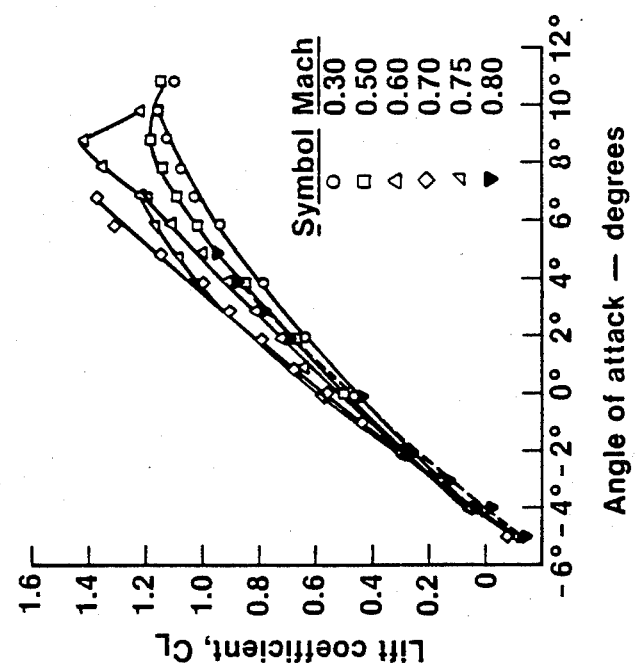

FIGS. 13 and 14 are graphical representations of wind tunnel test data illustrating the relationship between lift and drag coefficients for various Mach numbers and angles of attack for the 606 airfoil of the blade of the present invention. As indicated in FIG. 13, since there are no abrupt losses in lift or step increases in drag near maximum lift there is no indication that any shock wave induced separation occurs on the 606 airfoil of the present invention despite the relatively high local mach number at takeoff conditions. FIGS. 15 and 16 are graphical representations of wind tunnel test data illustrating similar relationships of lift and drag coefficients to angles of attack for the Series 16 airfoil the pressure coefficients of which are plotted in FIGS. 9–12.

Figure 18:
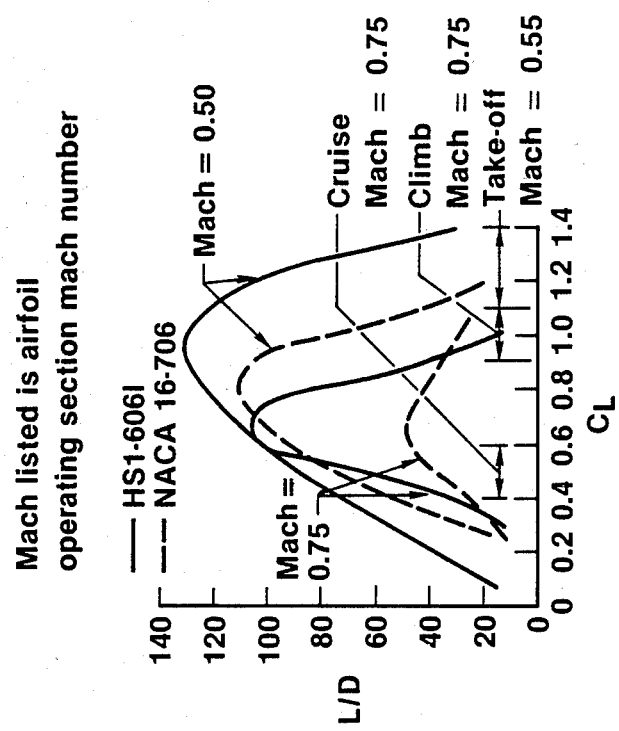
FIGS. 17 and 18 are graphical representations of lift and drag coefficients and lift-to-drag ratios respectively for one of the airfoil sections of the blade of the present invention and a corresponding NACA Series 16 airfoil.
Figure 17:
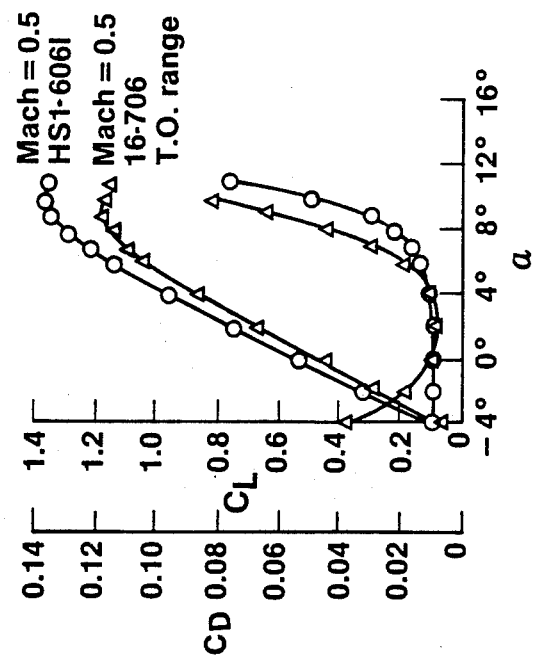

FIGS. 17 and 18 represent a comparison of data reduced from FIGS. 13–16. FIG. 17 clearly shows that at a takeoff condition, the airfoil of the present invention exhibits a 20% increase in maximum lift coefficient while FIG. 18 indicates that the airfoil of the present invention exhibits 60–70% higher lift-to-drag ratio in cruise and a 40–60% higher lift/drag ratio in climb than the Series 16 airfoil.

Model propellers, one comprising four blades with airfoils of the present invention and the other incorporating four NACA Series 16 blades were tested in the United Technologies Subsonic Wind Tunnel Test Facility in East Hartford, Conn. Both models were 3.25 ft. in diameter. Other than airfoil shape, and a slight difference in camber level, both models were geometrically identical, being of solid aluminum and incorporating the same planform, thickness ratio and twist distribution, with a 91 activity factor. The integrated design lift coefficients of the Series 16 blades were adjusted slightly to compensate for the higher effective camber levels of the airfoils of the present invention. The model propellers were tested in both 8 and 18-ft. throats of the above-noted wind tunnel. Testing in both throats permitted data to be gathered for conditions ranging from 0.03 Mach numbers up to and including Mach numbers of 0.6 and blade angles of from −20° to +81° with propeller speeds in the range of normal operation.

Figure 19:
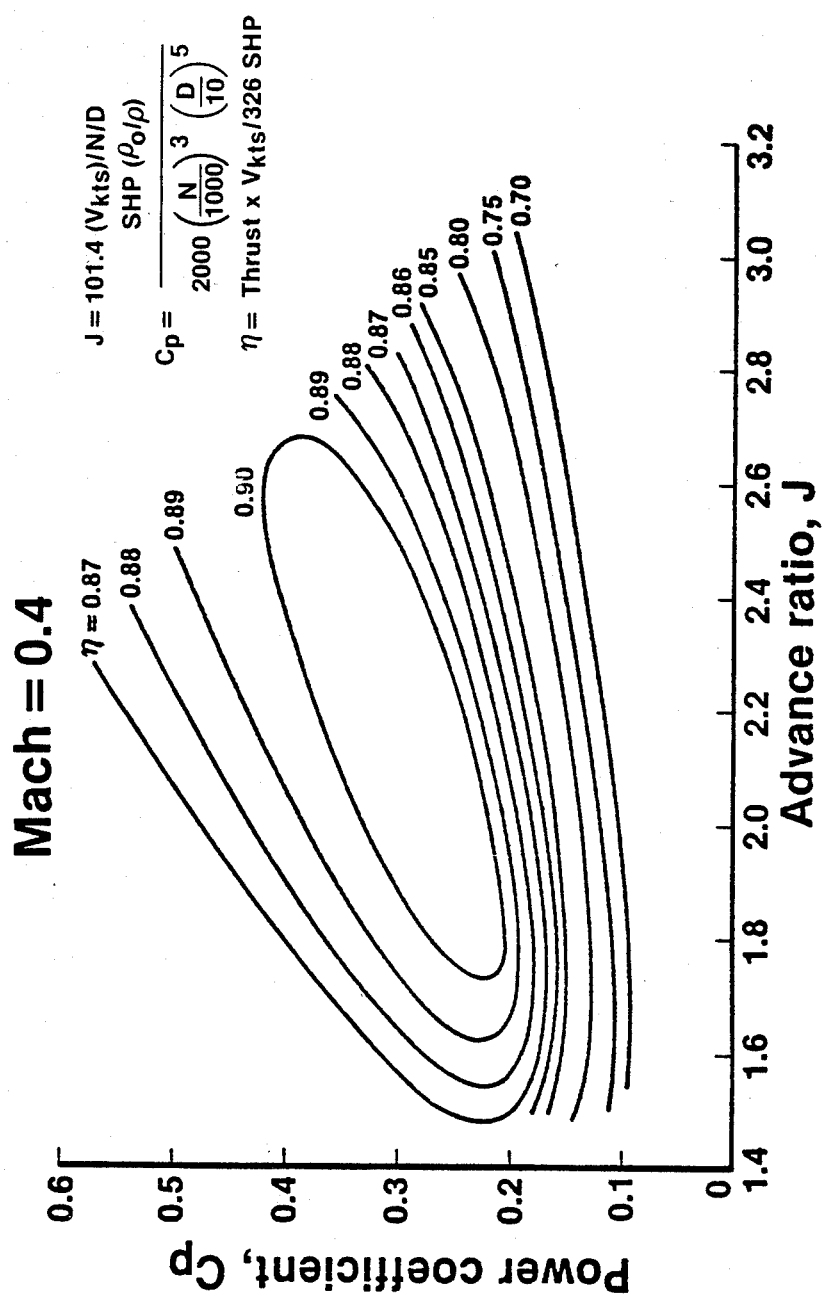
FIGS. 19 and 20 are performance maps of efficiency and power coefficient at high Mach numbers plotted against advance ratio for a propeller having the airfoil sections of the present invention and a propeller having NACA Series 16 airfoil sections respectively.
Figure 20:
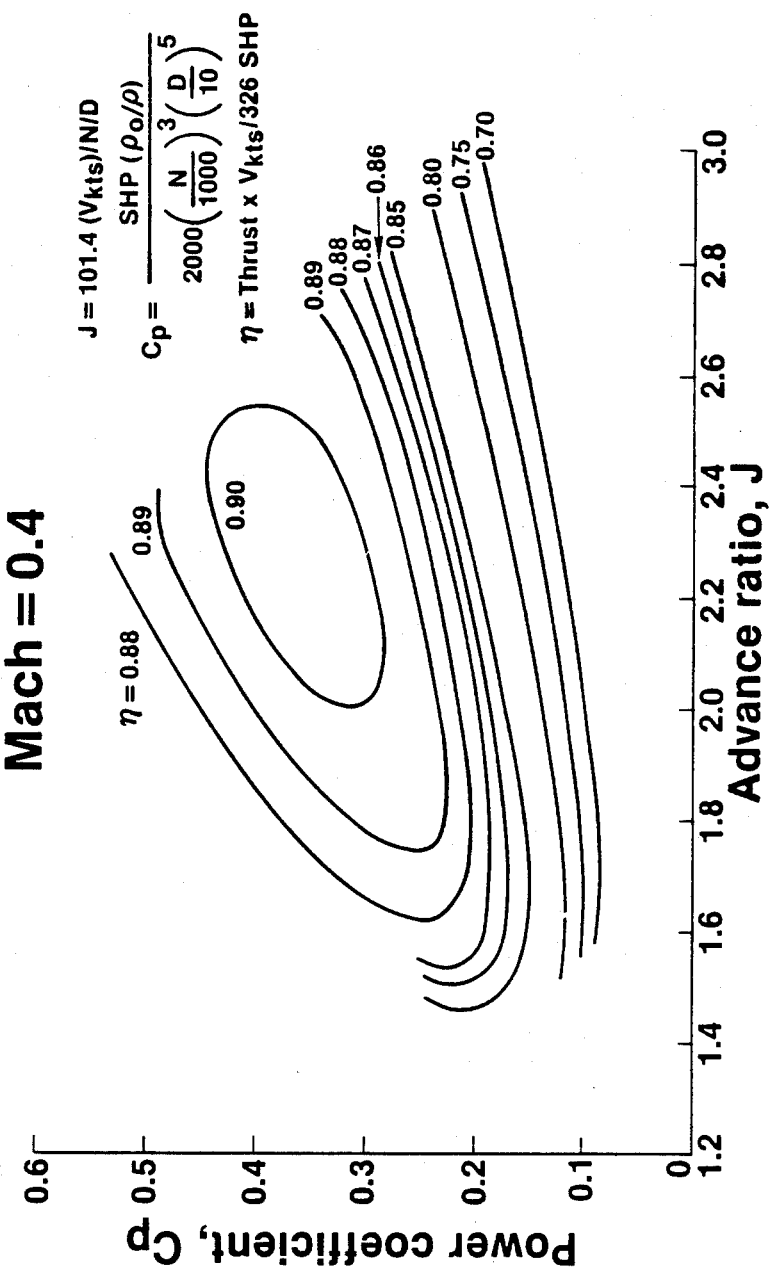

FIGS. 19 and 20 are representative of portions of the data obtained from this wind tunnel test and clearly show that at cruise Mach numbers of 0.4 the performance of the airfoil blade of the present invention is substantially better than that of the Series 16 blade as evidenced by the exhibited breadth of high efficiency region on the maps.

Figure 21:
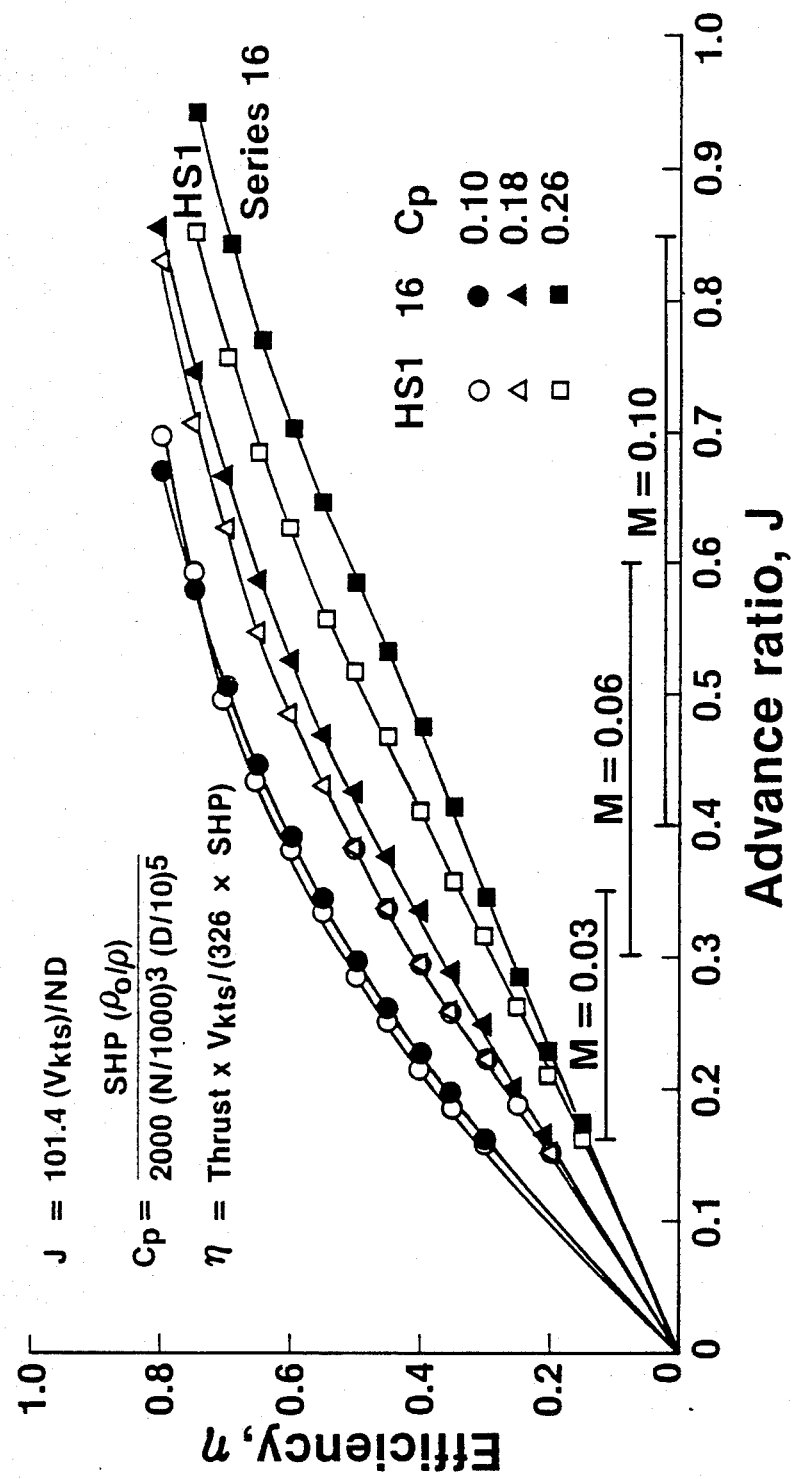
FIG. 21 is a plot of efficiency versus advance ratio at lower Mach numbers for the propellers whose performance maps are illustrated in FIGS. 19 and 20.

Referring to FIG. 21, a comparison of the two propellers at low Mach numbers (up to 0.10) is shown. This plot represents a blend of the efficiency maps derived from the wind tunnel test data at Mach numbers of 0.03 to 0.10. A study of this plot shows that as power coefficient is increased the airfoil blades of the present invention become progressively more efficient than the prior art Series 16 propeller blades. For example, it is noted that at a power coefficient of 0.10 the airfoil blades of the present invention exhibit an improvement of 1% in efficiency over the Series 16 airfoil while at a power coefficient of 0.26 and a Mach number in the 0.06 to 0.10 range, the blade of the present invention exhibits a 6% improvement in efficiency.

On the basis of these and various other test data, the propeller of the present invention was shown to be more efficient than the Series 16 propeller over a wide range of Mach numbers, advance ratios and power coefficients, representative of commuter aircraft propeller operating conditions.

Having thus described the invention, what is claimed is:

1. An airfoil blade having along substantially the entire length thereof, a cross-sectional airfoil shape comprising a rounded, generally parabolic leading edge portion fairing into a pressure surface; said pressure surface having a leading convex portion fairing into a trailing portion; said leading edge portion also fairing into a convex suction surface; said pressure and suction surfaces merging into a blunt trailing edge; one of said airfoil shapes having a thickness ratio of 0.04, a maximum thickness at approximately 0.35 x/c and a maximum camber at approximately 0.5 x/c; another of said airfoil shapes having a thickness ratio of 0.06, a maximum thickness at approximately 0.34 x/c and a maximum camber at approximately 0.50 x/c; another of said airfoil shapes having a thickness ratio of 0.08, a maximum thickness at approximately 0.33 x/c and a maximum camber at approximately 0.50 x/c; another of said airfoil shapes having a thickness ratio of 0.12, a maximum thickness at approximately 0.32 x/c and a maximum camber at approximately 0.38 x/c; another of said airfoil shapes having a thickness ratio of 0.20, a maximum thickness at approximately 0.315 x/c and a maximum camber at approximately 0.30 x/c and another of said airfoil shapes having a thickness ratio of 0.30, a maximum thickness at approximately 0.310 x/c and a maximum camber at approximately 0.29 x/c wherein x/c is the dimensionless chord length of said airfoil shapes; all of said airfoil shapes having a trailing edge portion of a thickness equal to approximately 10% of the maximum shape thickness.

2. The airfoil blade of claim 1 wherein for thickness ratios less than approximately 0.15, said trailing portion of said pressure surface is concave in shape and said convex leading suction surface portion is protuberant from said pressure surface.

3. The airfoil blade of claim 1 wherein said leading convex portion fairs into said trailing portion at a distance from the airfoil leading edge of approximately 10–15% of the airfoil chord.

* * * * *